Nov. 26, 1968  W. B. HILL  3,412,629
ADJUSTABLE ATTACHING UNIT FOR STEERING COLUMNS
Filed Jan. 21, 1966  3 Sheets-Sheet 1

INVENTOR.
WILLIAM B. HILL
BY
Agent

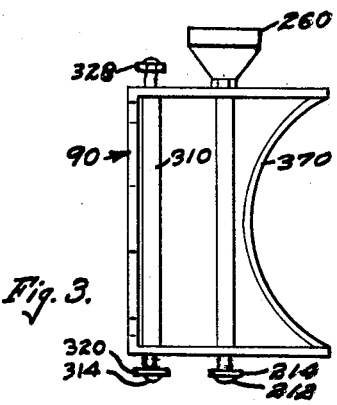
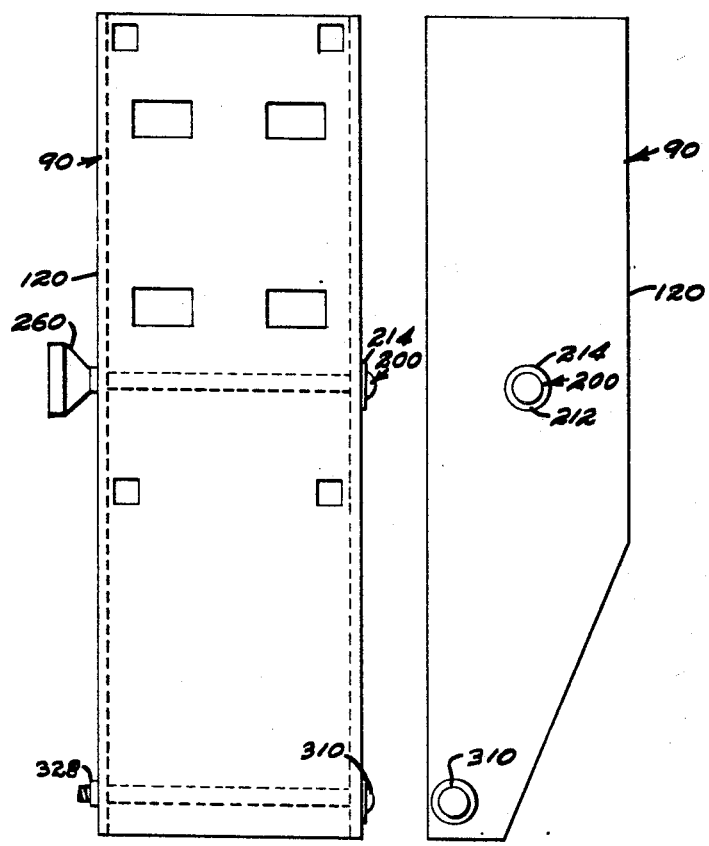

Nov. 26, 1968 W. B. HILL 3,412,629
ADJUSTABLE ATTACHING UNIT FOR STEERING COLUMNS
Filed Jan. 21, 1966 3 Sheets-Sheet 3

INVENTOR.
WILLIAM B. HILL
BY

United States Patent Office 3,412,629
Patented Nov. 26, 1968

3,412,629
ADJUSTABLE ATTACHING UNIT FOR STEERING COLUMNS
William B. Hill, R.R. 2, Mapleton, Minn. 56065
Filed Jan. 21, 1966, Ser. No. 522,272
4 Claims. (Cl. 74—493)

ABSTRACT OF THE DISCLOSURE

An adjustable attachment unit for the steering column of a motor vehicle has vehicle attached and column attached portions. Trackway elements and trackway following elements on said portions permit relative movement of said portions in directions for allowing the steering column to be adjusted both up and down and forward and rearward.

---

In the prior art substantially all efforts providing steering column adjustment have been developed for passenger automobiles only. Nothing, to my knowledge, has been successfully accomplished to provide these benefits for the weary truck driver.

Although automobiles are designed to a considerable extent for the comfort of the driver, truck drivers often drive much longer hours in trucks primarily designed for the economic factors of maximum load capacity per legal truck length with far less being done to relieve the discomfort of the driver.

A particular object is to provide an attaching unit which makes full use of the conventional features of telescopic steering columns and universal joint in the steering column and permitting its upper end to swing both upwardly and forwardly and downwardly and rearwardly.

A particular object is to provide an attaching unit which permits adjustments to be made safely while the motor vehicle is in motion at high speed.

A particular object is to provide an attaching unit which is simple and capable of economic manufacture in a durable and rugged form.

Yet another object is to provide an attaching unit which can be quickly installed and which has principles allowing it to be used on trucks of many types.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claims.

In the drawings:

FIGURE 3 is a detail of an inner frame as seen from an upper end.

FIGURE 4 is a view of the front side of the inner frame as seen from the left side in FIGURE 3.

FIGURE 5 is a view of the left-hand side of FIGURE 4.

Figures 1, 2:
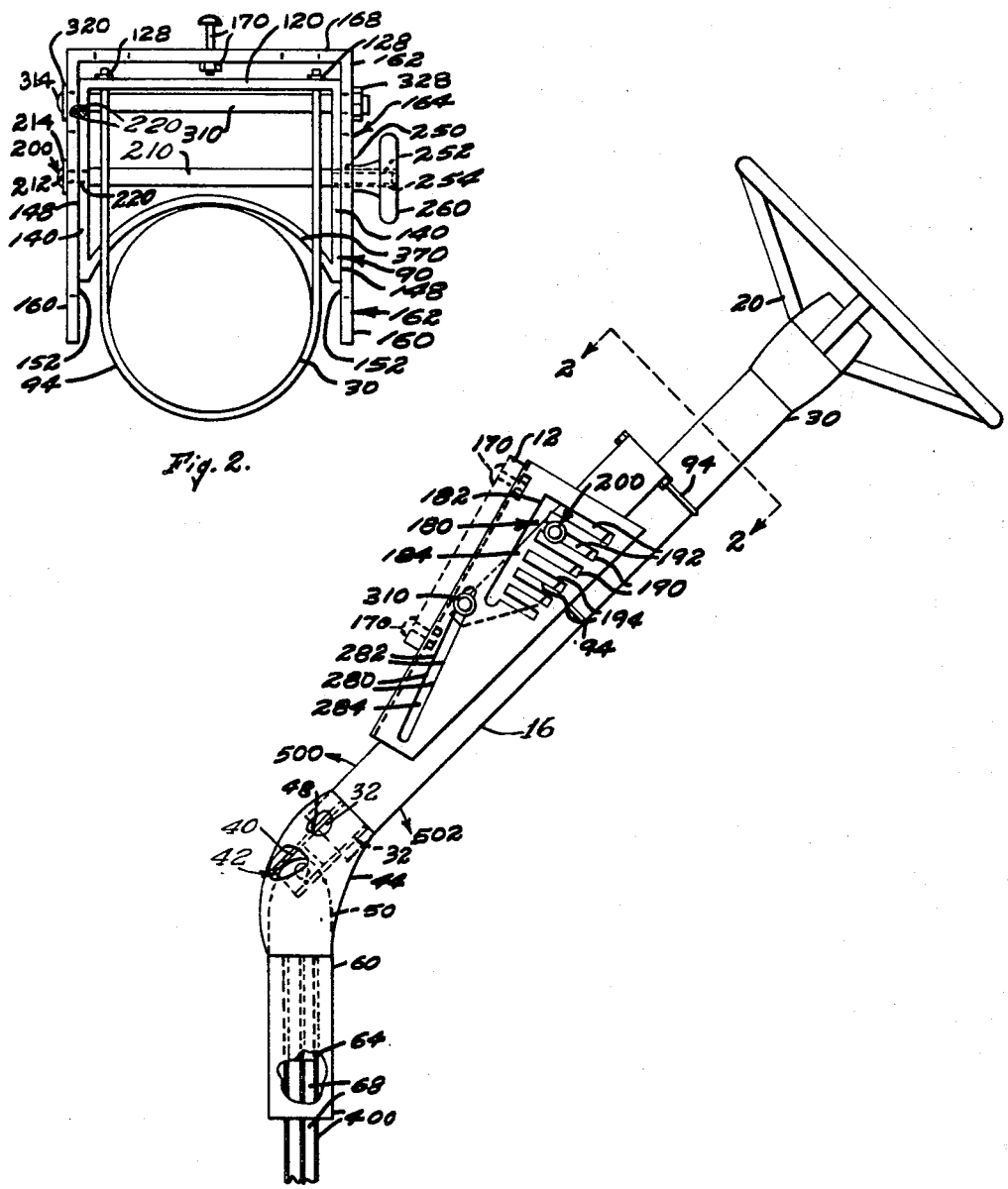
FIGURE 1 is a side elevation of the adjustable steering unit of this invention and shows partially in full and partially in dotted lines a dashboard member of a truck to which it is attached, portions of a cover being broken away to show other parts in full lines therebeneath.
FIGURE 2 is a sectional view taken along the line 2—2 of FIGURE 1, the view being diagrammatic in that the interior of the steering column is not shown since it is conventional a portion of a left side of a column attachable frame and a portion of a left side of a second frame being broken away to show a shank 220 therebeneath.
Figure 6:
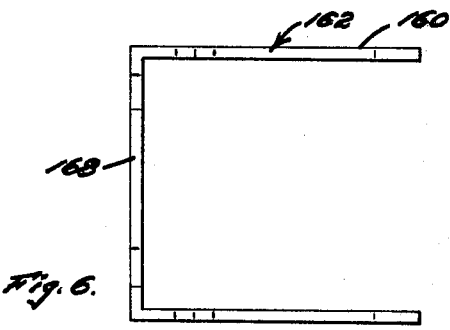
FIGURE 6 is a detail showing the upper end view of the outer frame.
Figure 7:
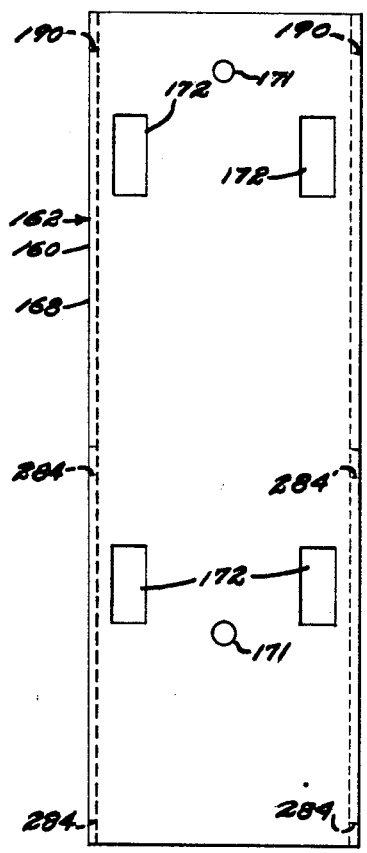
FIGURE 7 is a front view thereof.
Figure 8:
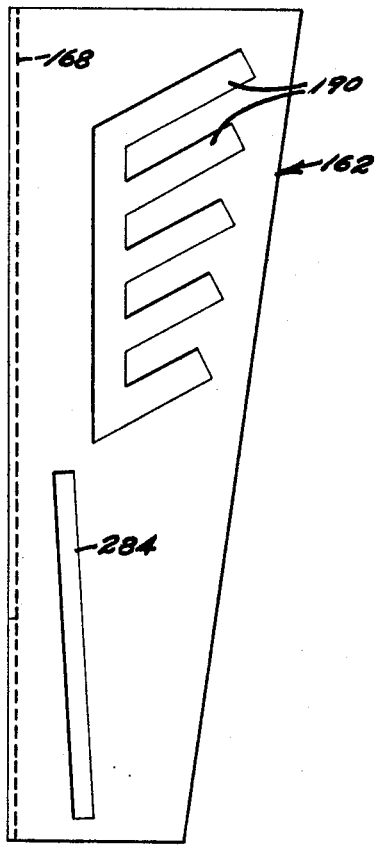
FIGURE 8 is a view as seen from the left-hand side of FIGURE 7.

The adjustable attaching unit of this invention is generally indicated at 10 in FIGURE 1 and is shown as attached to a vehicle and specifically to a dashboard member 12 of a truck shown in dotted lines in FIGURE 1. It is understood that the member 12 is attached to the remainder of a dashboard of a truck, not shown, which latter is also not shown.

The truck, not shown, has a steering column generally indicated at 16 and steering wheel 20. The conventional steering column 16 has an outer sleeve 30 which is normally stationary and has an inner rotating shaft 32 which rotates with respect to the sleeve 30, the shaft 32 being connected to a universal joint 40 shown in dotted lines in FIGURE 1, the universal joint 40 forming a part of a U-joint assembly generally indicated at 42, the joint assembly also having a cover 44.

The shaft 32 is attached to one portion 48 of the universal joint and the other portion 50 of the universal joint is fixed to an annular spline housing 60 having a non-round opening 64 extending into it from its lower side in which a non-round keyed shaft 68, of complemental cross-section to the walls of the opening 64, is slidably received.

It will be understood that all parts above described, with the exception of the adjustable steering unit 10, are all conventional in larger modern trucks.

The adjustable steering unit 10 of this invention has a steering column attachable portion 80 having a frame 90 attached to the steering column sleeve 30 preferably by means of U-bolts 94, the sides of which extend through a forward portion 120 of the frame 90 and have nuts 128 thereon.

Sides 140 of the column attachable frame 90 have forwardly to rearwardly extending surfaces 148 each disposed in a vertical plane in parallelism with and slidably receiving thereagainst the vertical forwardly to rearwardly extending inner side surfaces 152 of the right and left hand sides 160 of a second frame 162 which can be called the vehicle attached frame and which forms a part of the vehicle attached portion 164 of the attaching unit. The second frame 162 has a forward portion 168 which extends from left to right and which is suitably attached to the dashboard member 12 by any suitable means such as bolt means 170 shown in FIGURE 2.

The vehicle attached portion 164 has trackway means 180 mounted thereon providing an elongated connecting trackway 182, the trackway 182 being formed by the walls of a slot 184 which also form the trackway means 180.

A plurality of transverse trackways 190 are formed by the parallel walls of a plurality of parallel slots 192. The side walls 194 of each slot 192 can be considered to form a single transverse trackway 190.

A trackway following means generally indicated at 200 is adapted to move along the connecting portion or connecting trackway 182 and also along the transverse trackways or transverse trackway elements 190. The trackway following means 200 has as its first portion a stud 210 having a head 212 receiving a washer 214 therebehind, the stud 210 having a shank 220 which extends through desired one of the elongated trackway slots 192 with the inner end of the shank 220 firmly fixed to an outer surface of one of the rearwardly extending sides 140 of the frame 90.

The track following means 200 further comprises a second or right-hand stud 250 attached to the right-hand or outer side of the right-hand side 140 of the frame 90, the stud 250 having a threaded outer end shown at 252 which is threadedly received in a threaded opening 254 of a knob 260, whereby rotation of the knob 260 tends to draw the knob tightly up against the right-hand side 160 of the second frame 162 pressing it firmly against the hight-hand side 140 of the column attachable frame 90, whereby the knob 260 serves to firmly clamp the frames 90 and 162 together in such high frictional contact that they are, for all practical purposes, fixed with respect to each other although the leverage provided by the knob 260 is sufficient that it can be released by an operator of the truck by using one hand, safely, while on the road driving.

Between the sides 140 of the frame 90 is a brace 170 extending from right to left side and attached to each for holding the sides 140 firmly apart in the area between the studs 210 and 250.

It will be seen that the slot 284 can also be called an elongated holding track in the respective frame 162. A holding track element following portion 300 is provided by a bolt 310 having its ends projecting from the right and left end sides of the side portions 140 of the inner frame 90 and having outer portions of its shank extending through and slidably received in the slots 284 of the side portions 160 of the frame 162. The ends of the bolt 310 are a head 314 with washer 320 engaging the outer side of the left-hand side portion 160 and a nut 328 engaging the outer side of the right-hand side portion 160 of the frame 162 in slidable fashion so that the bolt 310 is adapted to follow the elongated guide slot 284 which is also called the holding track element 284.

It will be seen that the guide slot 284 of each side 160 is elongated in approximate parallelism with the elongated connecting trackway element or slot 182.

The outer frame 162 has identical sides 160 with all slots of the right side being in alignment with the slots of the left side as seen in side elevation.

The inner frame 90 has a column engagement strap 370 extending between and connected to the side 148 thereof, the strap 370 being concave on its rearward side to receive thereagainst the cylindrical column sleeve 30.

In operation, it will be seen that an operator can loosen the knob 260 and move the steering wheel 20 backwards and forwards with the trackway following means 200 sliding in a respective trackway 190.

The operator can move the steering wheel 20 forwardly to put the element 200 in the connecting trackway 180 thereby permitting the steering wheel to be raised and lowered in a direction parallel with the trackway slot 182.

During these motions, guiding and alignment are maintained by the holding track following element bolt 310 moving in the guide slot 284.

All of this movement is permitted by the universal joint 40 and by the conventional spline assembly 400 comprised of the spline housing 60 and the shaft 68.

It will be seen that this invention can be changed within the spirit of the following claims and such changes are considered to be within the scope of this invention.

I claim:

1. An adjustable attaching unit for attaching an elongated steering column to a vehicle, said attaching unit comprising: a column attachable portion having a frame, means for attaching said frame to a steering column in a certain fixed position with respect thereto, a vehicle attached portion having a second frame, means for securing said second frame to said vehicle in a fixed position with respect thereto, said vehicle attached portion having trackway means therein comprising an elongated connecting trackway, and said trackway means further comprising a plurality of transverse trackway means extending transverse to said elongated trackway means and connected thereto, trackway following means adapted to move along said connecting trackway means and also along said transverse trackway means, said trackway following means being fixed to the frame of said column attachable portion, said trackway means each being a recess means, means for attaching said steering column to said steering column attachable frame, said trackway means being disposed substantially in a plane and said trackway following means being movable substantially in said plane.

2. The combination of claim 1 in which said trackway means are slots.

3. The combination of claim 1 in further combination with an elongated holding track means in one of said frames, a holding track means following portion attached to the other of said frames and slidably engaged with said holding track means, said holding track means being elongated in a direction substantially in parallelism with said elongated connecting trackway means.

4. The combination of claim 1 in which said frames are disposed in lapping relationship.

References Cited
UNITED STATES PATENTS

| | | | |
|---|---|---|---|
| 2,865,222 | 12/1958 | Bachman | 74—493 |
| 3,028,766 | 4/1962 | Musilli | 74—493 X |
| 3,032,134 | 5/1962 | Banker | 74—493 X |
| 3,144,785 | 8/1964 | Steiner et al. | 74—493 |

MILTON KAUFMAN, *Primary Examiner.*